United States Patent [19]

Matthews et al.

[11] Patent Number: 4,610,801

[45] Date of Patent: Sep. 9, 1986

[54] COMPOSITIONS COMPRISING MINERAL PARTICLES IN SUSPENSION AND METHOD OF TREATING AQUEOUS SYSTEMS THEREWITH

[75] Inventors: Kenneth B. Matthews, Swanscombe; Christine A. Beckett, Higham; David E. Smith, New Barn; Richard R. Davidson, Cambridge, all of England

[73] Assignee: Blue Circle Industries PLC, London, England

[21] Appl. No.: 790,632

[22] Filed: Oct. 22, 1985

Related U.S. Application Data

[63] Continuation of Ser. No. 534,561, Sep. 22, 1983, abandoned.

[30] Foreign Application Priority Data

Sep. 24, 1982 [GB] United Kingdom ................ 8227366

[51] Int. Cl.$^4$ ............................................. C02F 1/00
[52] U.S. Cl. ................................. 252/181; 162/168.3; 162/181.1; 162/181.2; 162/181.3; 252/175
[58] Field of Search ................ 252/175, 181; 210/705, 210/734, 735; 162/168.3, 181.1, 181.2, 181.3

[56] References Cited

U.S. PATENT DOCUMENTS

| | | | |
|---|---|---|---|
| 3,892,587 | 7/1975 | Abercrombie, Jr. | 501/148 |
| 3,961,979 | 6/1976 | Abercrombie, Jr. | 501/148 |
| 3,994,806 | 11/1976 | Rausch et al. | 210/734 |
| 4,024,087 | 5/1977 | Lainer et al. | 252/179 |
| 4,402,851 | 9/1983 | Lindahl | 252/181 |
| 4,450,092 | 5/1984 | Huang | 252/181 |

FOREIGN PATENT DOCUMENTS

| | | |
|---|---|---|
| 3004611 | 8/1981 | Fed. Rep. of Germany. |
| 57-184430 | 11/1982 | Japan. |
| 845838 | 8/1960 | United Kingdom. |
| 870711 | 6/1961 | United Kingdom. |
| 1159819 | 7/1969 | United Kingdom. |
| 1214532 | 12/1970 | United Kingdom. |
| 1230166 | 4/1971 | United Kingdom. |
| 1312751 | 4/1973 | United Kingdom. |
| 1497280 | 1/1978 | United Kingdom. |
| 1527304 | 10/1978 | United Kingdom. |
| 2004535 | 4/1979 | United Kingdom. |
| 2016498A | 9/1979 | United Kingdom. |
| 1583881 | 2/1981 | United Kingdom. |
| 1588016 | 4/1981 | United Kingdom. |
| 2095226A | 9/1982 | United Kingdom. |
| 2134508 | 8/1984 | United Kingdom. |

Primary Examiner—Prince E. Willis
Assistant Examiner—Robert A. Wax
Attorney, Agent, or Firm—Brooks Haidt Haffner & Delahunty

[57] ABSTRACT

An aqueous slurry of mineral particles, for example calcium carbonate and/or calcium hydroxide, has a mineral solids concentration of at least 40% m/m and contains an agent that maintains the slurry at a pumpable viscosity but that acts as a flocculant upon dilution of the slurry. Suitable agents include cationic and amphoteric polyelectrolytes having nitrogen-containing groups, for example polyamines and dimethyl diallyl ammonium chloride polymers. The slurries may contain other components for example a synthetic hectorite or a dispersing agent such as a polyacrylate, polymethacrylate or polyphosphate. The slurries are useful in papermaking and in the treatment of sewage.

8 Claims, No Drawings

COMPOSITIONS COMPRISING MINERAL PARTICLES IN SUSPENSION AND METHOD OF TREATING AQUEOUS SYSTEMS THEREWITH

This application is a continuation of application Ser. No. 534,561, filed Sept. 22, 1983, now abandoned.

FIELD OF THE INVENTION

This invention relates to compositions comprising an aqueous suspension of mineral particles of high solids content.

It also relates to a method of treating an aqueous system with such a composition, optionally after dilution of the latter. Thus, for example, the method may be applied to the flocculation/coagulation of sewage or other waste water, or to the incorporation of flocculated filler in papermaking stock.

BACKGROUND TO THE INVENTION

Particulate minerals are useful in the treatment of sewage as they aid the clarification of waste water in, for example, conventional sedimentation processes, especially at the primary sedimentation stage. Thus, lime is well known as a coagulant in sewage sedimentation and in sludge conditioning prior to filtration. Lime is often used with the separate addition of other flocculants/coagulants, e.g. high molecular weight cationic polyacrylamides, ferric chloride, ferrous sulphate or alum.

This lime is normally used as a powder or as a dilute (say 10% solids) slurry prepared, for instance, by slaking on site. However, this requires plant to handle powdered lime or to slake quicklime; furthermore, powdered lime is an unpleasant material to work with. Moreover, the separate addition to the aqueous system of lime and other additives creates problems on site with handling, proportioning and metering.

Other particulate minerals, such as calcium carbonate are useful in sewage treatment, for example, as weighting agents. A mixture of hydrated lime and calcium carbonate can be particularly useful, as described in United Kingdom Patent Specification No. 2,095,226.

In papermaking, mineral particles such as calcium carbonate are used as fillers and pigments. The use of flocculated mineral particles is advantageous in that it allows higher than usual filler-loading levels to be achieved without loss of paper strength (see, for example, the discussion in U.K. Patent Specification No. 2,016,498). The flocculant may be added separately to the papermaking stock, before or after the filler is added as a slurry.

As an alternative to separate addition, both in sewage or other waste-water treatment and in papermaking, the flocculant may be added to a slurry of the mineral particles immediately before use. This requires special plant to ensure good mixing of the components and to ensure that the resultant suspension is conveyed immediately to the point of use. There are severe difficulties, however, in incorporating conventional flocculants into higher solids content slurries as they cause gross flocculation and thickening such that the resultant slurry does not flow readily and is not readily pumpable except with special equipment.

It would clearly be desirable to provide suspensions of mineral particles having a high solids content that are readily and economically transportable, especially such suspensions that contain the other components required to carry out the desired coagulation/flocculation process. Such suspensions could be manufactured with consistent quality and they would simplify on-site dosage and application, being a 'one-pack' product. Thus, they could obviate or reduce the need for expensive plant on site to handle powders, liquids or slurries, to proportion and meter components added separately or to mix particle suspensions and a flocculant at high speed. Furthermore, the higher the solids content, the greater is the reduction in the costs entailed in transporting water.

However, to be practicable, such suspensions of high solids content would have to be simple to handle and apply, and be readily pumped/metered at controlled rates. Here, two problems must be overcome. Firstly, the viscosity characteristics of high solids slurries deteriorate rapidly as their solids content is increased. For example, for a lime slurry with no additives and having a solids content of 50% by weight, the following measurements have been made: a yield of 1335 dynes/cm$^2$ and an apparent viscosity at 600 s$^{-1}$ shear rate of 264 cP (measurements made on a Haake Rotovisco RV2 viscometer using cup MV St and bob MVI).

Some reduction in viscosity can be achieved by the incorporation of a small amount of a dispersing or surface-active agent such as a polyphosphate, a salt of a polyacrylic acid or a salt of polymethacrylic acid. The latter two are preferred in water/sewage treatment. The use of these materials alone, however, generally leads to the production of a stubborn sediment on settling.

Secondly, the addition of a flocculant to a mineral suspension normally causes heavy flocculation of the particles and results in a thick paste which is difficult to handle in processing plant, slurry tankers, and the like.

SUMMARY OF THE INVENTION

The present invention now provides a composition for treating an aqueous system, which composition comprises (a) an aqueous slurry of mineral particles of at least 40% m/m mineral solids concentration and (b) an agent that at least substantially maintains the mobility of the slurry (a) and that exerts a flocculating action upon addition of the composition to an aqueous system at a dilution ratio of at least 20:1 (m/m).

The invention makes possible the formulation of self-flocculating, non-settling, pumpable, transportable "total" slurries, i.e. slurries which contain all the components necessary to effect the required coagulation/flocculation process. The component (b) in the slurry can be activated by simply diluting the slurry at the point of application with or into either water or the aqueous liquid of the system to be treated, whereupon it will enhance any flocculating action exerted by the mineral particulate matter. Looked at another way, the component (b) will cause an increase in the flocculation of the mineral particles upon dilution to a low solids content.

Accordingly, the present invention also provides a method of treating an aqueous system, in which there is applied to said system a composition of the present invention, said composition being applied as such or after dilution.

The mobility of the slurry is deemed to be maintained if the apparent viscosity of the slurry (as measured on a Haake Rotovisco RV2 viscometer at a shear rate of 600 s$^{-1}$) is not above 500 cP. In the case of lime-containing slurries it is desirable that the apparent viscosity should not exceed 300 cP. For all compositions of this invention, the apparent viscosity is preferably below 200 cP. In order to obtain acceptable pumpability, the slurry preferably exhibits a plastic viscosity of not more than 150 cP, especially not more than 100 cP, and a yield stress of not more than 600 dynes/cm$^2$. Normally the yield stress will not be below 50 dynes/cm$^2$ and is preferably from 50 to 300 dynes/cm$^2$.

By "self-flocculating" we mean that the composition forms flocs of particulate matter on dilution with or into water (at least a 20:1 (m/m) dilution). The water may be soft water, hard water or water that has been hardened by the addition of one or more salts of multivalent cations (e.g. $Ca^{2+}$, $Mg^{2+}$ or $Al^{3+}$) although the effects are better in hard or hardened water. In general, the water will contain dissolved salts equivalent to at least 50 ppm calcium hardness and typically up to 500 ppm. The water can also be the aqueous component of a system to be treated, such as sewage or a papermaking stock, which two systems usually contain suspended particulate matter of an anionic character. In such cases the formation of co-flocs of mineral particles from the slurry and particulate matter from the aqueous system being treated is comprehended within the method of this invention.

A "non-settling" slurry is one which exhibits acceptable stability and therefore a reasonable shelf life. To be of practical use a slurry must have an acceptable shelf life which in terms of these slurries is a resistance to the formation of a hard sediment on standing. An acceptable slurry may slowly settle to form a supernate and a sediment but the sediment must be readily redispersed on agitation (e.g. slow-speed sweep agitation) after at least 3, and preferably after at least 7, days' settlement.

DESCRIPTION OF PREFERRED EMBODIMENTS

The mineral particles can be of a single material or a mixture of materials. Preferred materials are the oxides, hydroxides, sulphates, carbonates and bicarbonates of the alkaline earth metals; especially preferred are calcium carbonate (in any form, for example limestone, whiting or precipitated chalk), calcium hydroxide and mixtures of these two (preferably mixtures with a weight ratio of from 19:1 to 1:19 and especially from 5:2 to 2:5). Other mineral fillers are also possible, such as calcium sulphate (e.g. gypsum), talc, clay, titanium dioxide, zinc oxide, lithopone, barium sulphate, kaolin or zinc sulphide. Useful sources of calcareous particulate minerals include waste materials from a cement works, e.g. flue dust, and waste materials from a lime works, lime softening process or desulphurisation process.

Although preferred compositions contain calcium carbonate, it is possible to use barium compounds as a partial replacement for the carbonate. The barium compounds, owing to their weight, may improve the settling of the sewage or other particulate waste to be treated.

Some calcium carbonates that occur naturally with an alumino-siliceous surface layer, or calcium carbonates so modified, may be of particular advantage in this invention.

The component (b) that at least maintains the mobility of the slurry will contribute to the required coagulation/flocculation process when the composition is applied to the aqueous system to be treated. One class of preferred agents are cationic polyelectrolytes having nitrogen-containing groups (e.g. quaternary nitrogen-containing groups), e.g. polyamines (including the quaternary polyamines), polyimines and dimethyl diallyl ammonium chloride polymers.

One group of such polyelectrolytes, which are especially suitable for the treatment of sewage, are those with a low molecular weight (in particular 10$^6$ or less) and high change density; in papermaking, such polyelectrolytes of higher molecular weight may also be suitable.

Amphoteric polyelectrolytes, e.g. those having nitrogen-containing groups (e.g. quaternary nitrogen-containing groups), may also be useful herein.

Especially preferred for sewage treatment are quaternary polyamines, e.g. those available under the trade names Magnafloc 1597 (from Allied Colloids) and Accurac 41, Superfloc C573 and Accostrength 711 (from American Cyanamid); dimethyl diallyl ammonium chloride (DMDAAC) homopolymers, e.g. those with molecular weights of from 30,000 to 10$^6$, such as those available under the trade names Catfloc, Catfloc T and Catfloc T-1 (from Chemviron); and especially preferred for papermaking are DMDAAC/acrylamide co-polymers, e.g. those available in solution or emulsion form under the trade names WT 2860, WT 2640, WT 2575, WT 2635 and WT 5504 (from Chemviron).

Polyethylene imines, such as those available under the trade name Polymin (from BASF), may also be used.

Generally, it has been found that the cationic and amphoteric agents described above for component (b) do not merely maintain the mobility of the slurry but actually increase it at any given concentration of mineral particles.

Provided that the composition contains calcium hydroxide the component (b) may also be selected from anionic polymers, especially the anionic polyacrylamides, and more especially such polyacrylamides of high molecular weight, e.g. those available under the trade marks Magnafloc 155 and Magnafloc 156.

Component (b) may be present in the composition in an amount of, in general, from 0.0075 to 2%, preferably from 0.01 to 1.0%, on a dry weight basis.

The substances mentioned above as being suitable as component (b) are generally regarded as flocculants; it is therefore surprising that they can be used in accordance with the present invention to prepare mobile slurries or suspensions of high solids content.

The compositions of this invention may, of course, contain other components. For example (c) a structure-modifying agent (structuring aid) may be included, if appropriate. Synthetic hectorite has proved suitable for this purpose.

The structure-modifying agent (c) may be present in the composition in an amount of, in general, from 0.005 to 0.5%, preferably from 0.01 to 0.1% on a dry weight basis.

The composition of this invention may be prepared by initially forming an aqueous slurry of mineral particles in the presence of (d) a dispersant and then adding the component (b). Other methods of preparation may, of course, be employed, for example the dispersant may be included in the particulate mineral starting material and the component (b) may be added stepwise during the formation of the slurry.

Suitable dispersants are polyphosphoric acids, polyacrylic acid, polymethacrylic acid and their salts, as well as lignosulphonates and the like. The dispersant (d) may be present in the composition of this invention in an amount of, in general, from 0.005 to 2%, preferably from 0.01 to 0.5%, on a dry weight basis.

Of course, each component (b), (c) and (d) can be a mixture of suitable materials.

In order to improve the efficiency of the treatment of sewage with a composition of the present invention, especially with a preferred composition that contains a mixture of lime and calcium carbonate as the mineral component, it is possible to use one or more auxiliary agents selected from known flocculants, such as sodium aluminate, ferric sulphate, ferrous sulphate, aluminium chlorohydrate, polyelectrolytes or, preferably, aluminium sulphate (papermakers' alum). Although it is possible to include the auxiliary flocculant entirely in the present composition, it is preferred to add some or, preferably, all of the auxiliary flocculant to the sewage in a separate addition step after the addition of the present composition. Such a separate addition can settle the light, loose flocs that occasionally break away from the main flocs or it can improve the characteristics of the originally formed flocs in order to improve settlement. It is, however, also possible to add the present composition (or "total slurry") in steps.

The mixing regime, in particular the level of shear and the period for which the additives are left in contact with the system being treated, can influence the efficiency of the process of the present invention. However, suitable conditions can be determined in any given situation.

As mentioned in No. GB-A-2095266 (page 1, line 49 to page 2, line 9) various types of apparatus are used for the settling and clarification processes in the treatment of sewage, including static settling tanks (which may be coupled to a flocculation unit), sludge-blanket clarifiers, and the "once-through" plant developed by P. Stead and B. Winfield for the rapid sedimentation of primary sewage. The present compositions can be used with these and other apparatuses, as well as with an hydraulic separating device, e.g. the separator described in No. GB-A-2,082,941.

The compositions of this invention find particular use in the treatment of sewage and in papermaking (although the lime-containing compositions are usually inappropriate for the latter). Further applications for these slurries include use in water treatment (e.g. the softening of water), in the treatment of waste effluents, e.g. from pigs, abattoirs and heavy-metals industry, and for the desulphurisation of gases, for example in wet scrubbers and the like.

The optimum amount of the "total slurry" to be used in the process of the invention will depend on the nature of the aqueous system to be treated and the conditions under which the addition is to be made. Commonly, it will be appropriate to employ a dosage rate of 100 to 1,000 ppm, typically from 200 to 500 ppm, on a dry mineral basis relative to the total aqueous system to be treated.

SPECIFIC EXAMPLES

In the following Examples, the components were selected from the following materials.
Particulate Mineral:
Northern or Sourthern (English) chalk whitings in powder, high solids slurry or filter-cake form. Hydralime (hydrated lime; from Blue Circle Industries).
Dispersant:
Tetron (tetrasodium pyrophosphate; from Albright & Wilson).
Dispex N40 (sodium polyacrylate; from Allied Colloids).
Structure Modifier:
Laponite RD (synthetic hectorite; from Laporte).
Flocculant:
WT 2575 (DMDAAC/acrylamide copolymer in solution form; high molecular weight, cationic).
WT 5504 (DMDAAC/acrylamide copolymer in emulsion form; amphoteric).
Magnafloc 1597 (a quaternary polyamine; molecular weight about $5 \times 10^5$; about 50% active as marketed).
Magnafloc 155 or 156 (high-molecular-weight (ca. $5 \times 10^6$) anionic polyacrylamides; anionic character 20%).
Catfloc T-1 (a DMDAAC homopolymer).
Accurac 41 (a quaternary polyamine).
Superfloc C573 (a quaternary polyamine).
Colour Improvement Agent:
Sodium hypochlorite solution (15% available chlorine).

All viscosity measurements were effected using a Haake Rotoviscon RV2 viscometer at a shear rate of $600\ s^{-1}$. Except where stated otherwise, the slurries of this invention described in the Examples were non-settling, as defined above.

Examples 1 to 4 describe compositions that would be suitable for use in the preparation of paper fillers.

EXAMPLE 1

The following formulation was prepared:
52.6 kg water
256.8 kg 73.6% m/m Southern whiting filter cake
519.7 g Tetron
75.6 g Laponite RD
945 ml sodium hypochlorite solution
4.7 kg WT 2575

The dispersant and structure modifier were added simultaneously under high shear to a slurry of the whiting in the water. Sodium hypochlorite solution was added under high shear, followed by the flocculant under just sufficient shear to produce a homogeneous total slurry of 60% m/m solids content. Apparent viscosity 259 cP; yield 557 dynes/cm².

This total slurry was used in the preparation of laboratory paper handsheets, whereby the undiluted total slurry was pumped into papermaking pulp thin stock, thereby diluting the slurry by a factor of from 120:1 to 270:1, depending on the level of filler loading, whereupon the slurry solids flocculated. A high-solids whiting slurry was used in laboratory hand-sheet preparation under identical conditions to provide a comparison for the performance of the total slurry. Advantages of the use of total slurry in terms of filler retention and paper strength were evident in the results:

TABLE 1

| % Whiting retained on Handsheet | | Burst Strength (Burst Ratio) | | Tensile Strength (Breaking Length) | |
|---|---|---|---|---|---|
| Whiting Slurry | Total Slurry | Whiting Slurry | Total Slurry | Whiting Slurry | Total Slurry |
| 5.7 | 9.1 | 3.96 | 4.17 | 6525 | 6969 |
| 8.0 | 12.3 | 3.56 | 4.07 | 6135 | 6582 |
| 11.8 | 15.9 | 3.07 | 3.72 | 5579 | 6264 |

EXAMPLE 2

Formulation:
1042.5 g 70% m/m solids, colour-improved whiting slurry
1.569 g Tetron
157.8 g water
18.25 g WT 2575

The dispersant was added to the whiting slurry (which contained a small quantity of Laponite RD) under high shear, followed by the water and flocculant under low shear to give a 60% m/m total slurry. This order of addition ensured maximum efficiency of use of the dispersant by dissolution in the maximum solids content whiting slurry. Apparent viscosity 350 cP; Yield 440 dynes/cm$^2$.

The pumpable total slurry could be used to prepare flocculated filler by dilution into a papermaking thin stock, as described in Example 1.

EXAMPLE 3

Formulation:
500 g 73.6% whiting filter cake
64.2 ml water
0.29 g Tetron
0.15 g Laponite RD
1.84 ml sodium hypochlorite solution
0.92 g WT 5504

A method of preparation similar to that of Example 1 was used to give a 65% total slurry, which was stable to hard-sediment formation for 11 days and more. Apparent viscosity 129.6 cP; yield 176 dynes/cm$^2$.

The pumpable total slurry could be used to prepare flocculated filler by dilution into a papermaking thin stock, as described in Example 1.

EXAMPLE 4

The following formulation was prepared.

| | |
|---|---|
| Deionised water | 100 g |
| Snowcal 6ML, natural chalk whiting (from Blue Circle Industries) | 194 g |
| The whiting was added in portions to the water while stirring with a laboratory propeller stirrer. The mixture was thick, "short" and was not circulated by the stirrer, and on dilution with deionised water formed shear-reversible flocs. There was then added | |
| Accurac 41 | 0.67 g |
| The mixture thinned at once and was circulated by the stirrer indicating at least partial deflocculation of the particles. It was now possible to add: | |
| Snowcal 6ML | 40.0 g |
| There was some thickening, and there was further added: | |
| Accurac 41 | 0.5 g |
| | 335.17 g |

The resulting suspension had a content of whiting of 69.8% w/w. It had a pumpable viscosity. Flocculation would occur on addition to anionic paper stock. The suspension showed no hard sedimentation after 1 month's storage. During this time there was a slight thickening and an increase in the gel-structure present initially; this structure was presumably responsible for the resistance to hard sedimentation.

In passing, it may be mentioned that the degree of flocculation of dilute particle suspensions may semi-quantitively be assessed by observing the rate of sedimentation in a beaker, and the clarity of the supernatent liquid. It is also valuable to observe a pool of a suspension of white particles kept in gentle motion on a black surface. Floc formation can in this way be observed by eye. The flocs may be broken down to an extent by rubbing with a finger, and reflocculation, if present, observed.

The following Examples 5-12 describe compositions that would be suitable as coagulant/flocculant additives in sewage treatment.

EXAMPLE 5

(a) A lime/carbonate slurry was made up as follows using calcium carbonate in slurry form:
42.5% m/m solids whiting slurry (Snowcal 20SW; from Blue Circle Industries): 300 g
Hydralime: 127.5 g
Water (mains): 82.5 g
This slurry had the following viscosity figures: yield 484 dynes/cm$^2$; apparent viscosity 120 cP.

(b) Magnafloc 1597 (0.05% on a dry weight basis) was then added to the above slurry and mixed in a high speed disperser. The resultant slurry had the following viscosity figures: yield 161 dynes/cm$^2$; apparent viscosity 54 cP.

The clarification of sewage on settlement could be improved by the flocculation of the gross and colloidal suspended matter using the slurry. The efficiency of the slurry in treating sewage was shown firstly in the laboratory using a conventional "jar test" (see J. Bratby, "Coagulation and Flocculation", 1980, Uplands Press Limited, Chapter 8, pp 265–266 and 271–272) with the following stirring regime: 30 seconds' fast mixing, 5 minutes' slow stirring and 15 minutes' settlement time before withdrawing a sample for tests on turbidity, pH and suspended solids content. The following results were obtained:

TABLE 2

| "Total Slurry" Dose mg/l | Suspended Solids mg/l | Turbidity NTU | pH |
|---|---|---|---|
| 0 | 275 | 275 | 7.7 |
| 200 | 94 | 80 | 8.5 |
| 400 | 48 | 32 | 9.5 |
| 600 | 26 | 20 | 9.9 |
| 800 | 23 | 14 | 10.7 |

(NTU = nephelometric turbidity units).

The effect of predilution was also investigated. For example, in sewage treatment using a 437 mg/l dose of the total slurry of Example 5(b), the following results were obtained:

TABLE 3

| | Turbidity (NTU) |
|---|---|
| Crude sewage | 200 |
| No predilution | 57 |
| 5:1 predilution of slurry | 54 |
| 10:1 predilution of slurry | 53 |
| 20:1 predilution of slurry | 38 |
| 50:1 predilution of slurry | 24 |
| 100:1 predilution of slurry | 14 |

A predilution with water of 20:1 or more is beneficial. However the water in the aqueous sewage, papermaking or other system being dosed can provide a suitable level of dilution to effect flocculation.

The effect of different shear regimes was also investigated by predilutng the total slurry of Example 5(b)

and then adding the diluted composition to sewage in a conventional jar test during a period of rapid mixing. The treated sewage was then subjected to a period of slow mixing following which the turbidity was measured. The results are summarised in the following table.

TABLE 4

| Addition of 2.5% m/m TS (g) | TS (ppm) | Rapid Mixing Time (secs.) | Slow Mixing Time (mins.) | NTU |
|---|---|---|---|---|
| 8 | 400 | 5 | 2.5 | 71 |
| 8 | 400 | 15 | 2.5 | 65 |
| 8 | 400 | 20 | 2.5 | 58 |
| 8 | 400 | 30 | 2.5 | 58 |
| 8 | 400 | 40 | 2.5 | 42 |
| 8 | 400 | 30 | 5.0 | 40/41 |
| 8 | 400 | 30 | 15.0 | 33 |

Notes:
TS = total slurry
NTU = turbidity = nephelometric turbidity units.

At a conventional sewage works the following results were achieved at the primary stage. A 50% m/m total slurry prepared according to Example 5(b) was prediluted by at least 20:1 with water (pressurised returned effluent could have been used) immediately before addition to one half of the influent screened sewage. Good mixing occurred as the sewage passed over a weir into the first distribution chamber on passage to one of two primary sedimentation tanks. The remaining half of the influent screened sewage passed untreated to the second primary sedimentation tank as a control.

TABLE 5

| Parameter | Crude Sewage (Mean Values) | Untreated Settled Sewage (Mean Values) | Treated Settled Sewage (Mean Values) |
|---|---|---|---|
| Suspended Solids (mg/l) | 334 | 159 | 102 |
| Turbidity (NTU) | 315 | 168 | 67 |
| E. coli (No. × 10$^7$/100 ml) | 1.24 | 1.12 | 0.16 |
| BOD$_5$ (mg/l) | 208 | — | 97 |
| Phosphate (mg/l) | 10.5 | 10.6 | 2.0 |

EXAMPLE 6

(a) A 50% m/m lime/carbonate slurry was prepared as in Example 5(a). Yield 425 dynes/cm$^2$; apparent viscosity 104 cP.

(b) After addition of 0.05% Catfloc T-1, in a high speed disperser, a slurry was obtained having the following figures: yield 161 dynes/cm$^2$; apparent viscosity 59 cP. This sample exhibited suitable flocculation characteristics. This slurry was added to sewage from Longreach, Dartford, England, in a conventional "jar test". The following results were obtained:

TABLE 6

| Total-slurry dose (ppm) | Turbidity (NTU) | pH |
|---|---|---|
| 0 | 283 | 7.8 |
| 200 | 78 | 8.6 |
| 400 | 43 | 9.1 |
| 600 | 26 | 9.4 |
| 800 | 20 | 9.7 |

EXAMPLE 7

(a) A number of jar tests were carried out in which sewage was treated by the addition of a total slurry according to the present invention and prepared as described in Example 5(b). The treated sewage was then further treated by the addition of either ferric sulphate or aluminium sulphate (alum), these being representative of the conventional flocculants used in the treatment of sewage. The turbidity of the sewage treated in the aforesaid manner was compared with the turbidity of the sewage treated with the total slurry alone. The results are given in the following table:

TABLE 7

| Flocculant ppm | TS ppm | NTU (TS + flocculant) | NTU (TS alone) | Improvement (%) |
|---|---|---|---|---|
| Ferric sulphate 40 | 200 | 26 | 40 | +35 |
| Alum | | | | |
| 40 | 100 | 18 | 79 | +77.2 |
| 40 | 200 | 13 | 40 | +67.5 |
| 40 | 500 | 11 | 28 | +60.7 |

Notes:
TS = total slurry
NTU = turbidity measured in nephelometric turbidity units.

Improvement was calculated using the formula

Improvement = $(A - B/A) \times 100\%$ wherein
A = NTU obtained with total slurry alone
B = NTU obtained with total slurry and subsequent addition of the conventional flocculant.

(b) Two further series of jar tests were carried out in which sewage was treated with a total slurry prepared as described in Example 5(b) and with alum. In one series, the entire dose of alum was added subsequently to the addition of the total slurry; in the other series, a proportion of the alum was included in the total slurry itself, the remainder of the alum being added to the sewage after the alum-containing total slurry had been added.

Control tests were carried out in which only an alum-free total slurry was added to the sewage. The turbidity (in NTU) and the pH of the treated sewage were measured in each test and the results are given below:

TABLE 8

| Total Slurry (ppp) | Alum added with total slurry (ppm) | Alum added separately (ppm) | NTU | pH |
|---|---|---|---|---|
| 100 | 5 | 35 | 23 | 7.9 |
| 100 | 0 | 40 | 18 | 7.9 |
| 100 | 0 | 0 | 79 | 8.0 |
| 200 | 10 | 30 | 38 | 8.3 |
| 200 | 0 | 40 | 28 | 8.3 |
| 200 | 0 | 0 | 58 | 8.5 |
| 500 | 25 | 15 | 21 | 8.9 |
| 500 | 0 | 40 | 11 | 9.0 |
| 500 | 0 | 0 | 28 | 9.0 |

These and other tests have indicated that improvements in the clarification efficiency of the lime/carbonate total slurry treatment process can be gained by the separate addition of a conventional flocculant to the sewage after the total slurry has been added. Alum has given the largest increase in efficiency.

The optimum level of addition of the auxiliary flocculant will obviously depend upon the nature of the sewage and will have to be determined at any given site. However, the cost of the separate addition of alum may be offset by the possibility of reducing the dosage level of the total slurry. For example, as indicated in Table 8, an addition level of 500 ppm total slurry alone gave a turbidity of 28 NTU, whereas the same turbidity could be achieved by the addition of only 200 ppm total slurry in conjunction with a subsequent addition of 40 ppm alum.

Although, as indicated above, it would be feasible to incorporate the auxiliary flocculant, wholly or partly, into the total slurry, it has been found that any improvements in clarification efficiency are not cost effective.

EXAMPLE 8

The slurry of Example 5(b) was used as the flocculant in an upward flow sludge blanket unit treating domestic sewage. The flocculant slurry was metered from the supply tank at 400 ppm (dry basis) on sewage flow ratio, and was continuously diluted with mains water at the 40:1 level. The preflocculated slurry was then added to the influent crude sewage. Good flocculation of the suspended matter was achieved and a sludge or floc blanket readily formed in the unit. The quality of the effluent which discharged from the top of the unit was compared with the influent sewage and good clarification was evident when the sewage flow through the upward flow sludge blanket was at a 1 l/s/m² surface loading level.

| Raw Sewage | | Results: Effluent | | |
|---|---|---|---|---|
| Suspended solids mg/l | pH | Suspended solids mg/l | pH | Turbidity (NTU) |
| 350 | 8.1 | 58 | 9.1 | 50 |

EXAMPLE 9

A slurry was prepared as follows:

| | |
|---|---|
| Snowcal 4ML (chalk whiting; from Blue Circle Industries) | 50 g |
| Deionised water | 50 g |
| Hydrated lime | 50 g |
| Deionised water | 20 g |
| (The resultant mixture was a slip-paste of 59% solids content) | |
| Accurac 41 | 0.5 g |
| (There was an increase in the flow indicating some deflocculation) | |
| Superfloc C573 flocculant | 1.0 g |
| | 171.5 g |

A composition of acceptable flow and stability properties was obtained.

COMPARISON EXAMPLE A

When high molecular weight, cationic polyacrylamides typically used in sewage treatment (e.g. Zetag 92, Zetag 51; from Allied Colloids) are added to a lime/carbonate slurry, heavy flocculation occurs such that the slurries become too thick to pump. The following formulation was prepared.
Snowcal 20SW (42.5% m/m): 300 g
Hydralime: 127.5 g
Water: 82.5 g
Zetag 92 (0.04% on dry solids): 0.1 g The resultant slurry had the following viscosity properties: no yield value as such (pseudoplastic); apprarent viscosity (at 600 sec$^{-1}$) 386 cP.

EXAMPLE 10

Formulation:
Snowcal 20SW: 300 g
Hydralime: 127.5 g
Water (mains): 82.5 g

Magnafloc 156 (0.0125% on a dry weight basis) was then added. The resultant slurry had an apparent viscosity of 114 cP and a yield value of 393 dynes/cm², and produced very coarse flocs on dilution.

EXAMPLE 11

The following formulation was prepared

| | |
|---|---|
| Hydrated lime | 50.0 g |
| Deionised water | 60.0 g |
| 10% sodium hydroxide solution | 2.0 g |
| Snowcal 3ML (calcium carbonate) | 50.0 g |
| 50% Dispex N40, 50% Accurac 41 | 1.5 g |
| 0.28% Zetag 92 solution containing 2.0% of sodium hydroxide | 10.0 g |
| | 173.5 g |

This sample was prepared by hand stirring and showed freedom from sedimentation and a tendency to become thinner on standing. Flocculation in hard water was extremely good.

EXAMPLE 12

The following formulation was prepared:

| | |
|---|---|
| Hydrated lime | 100 g |
| Deionised water | 90 g |
| 2% caustic soda solution | 4 g |
| 5% Dispex N40/Accurac 41 | 4.7 g |
| 0.28% Zetag 92, 0.28% caustic soda solution | 10.0 g |
| | 208.7 g |

This was just pumpable at 50% solids content but thinned considerably on standing. The apparent viscosity was 95 cP and the yield stress 88 dynes/cm². Flocculation in tap-water was extreme.

As can be seen from the two foregoing Examples, it is possible to incorporate a cationic, high-molecular-weight polyelectrolyte such as a polyacrylamide (normally a bridging flocculant for mineral particles) into the compositions of the present invention, especially those that contain a cationic low-molecular-weight polyelectrolyte as the component (b).

We claim:

1. A composition for treating an aqueous system, which composition comprises (a) an aqueous slurry of mineral particles of at least 40% m/m mineral solids concentration, characterised in that it also comprises (b) an agent or mixture of agents that at least substantially maintains the mobility of the slurry, such that the apparent viscosity of the slurry does not exceed 500 cP (as measured at a shear rate of 600 s$^{-1}$) and that exerts a flocculating action upon dilution of the composition with or into water at a dilution ratio of at least 20:1 (m/m), said agent(s) being selected from cationic polyelectrolytes that have nitrogen-containing groups, amphoteric polyelectrolytes that have nitrogen-containing groups and, provided that the mineral particles include calcium hydroxide particles, anionic polyacrylamides.

2. A composition according to claim 1, characterised in that the mineral particles are selected from alkaline earth metal oxides, alkaline earth metal hydroxides, alkaline earth metal carbonates, alkaline earth metal bicarbonates, alkaline earth metal sulphates, clay, talc, titanium dioxide, zinc oxide, lithopone, and mixtures of any of these.

3. A composition according to claim 1, characterised in that the mineral particles are selected from calcium carbonate, calcium hydroxide and mixtures thereof.

4. A composition according to claim 3, characterised in that the mineral particles comprises a mixture of calcium carbonate and calcium hydroxide at a weight ratio of 19:1 to 1:19.

5. A composition according to claim 1, characterised in that component (b) is selected from polyamines, polyimines and dimethyl diallyl ammonium chloride polymers.

6. A composition according to claim 5, characterised in that the component (b) is selected from quaternary polyamines, dimethyl diallyl ammonium chloride homopolymers, dimethyl diallyl ammonium chloride/acrylamide copolymers and mixtures of any of these.

7. A composition according to claim 1, characterised in that component (b) is present in an amount of from 0.0075% to 2% of the composition on a dry weight basis.

8. A composition according to claim 1, characterised in that it comprises one or more components selected from the group consisting of synthetic hectorite, polyphosphoric acids and their salts, polyacrylic acids and their salts, polymethacrylic acids and their salts, and lignosulphonates.

* * * * *

UNITED STATES PATENT AND TRADEMARK OFFICE
CERTIFICATE OF CORRECTION

PATENT NO. : 4,610,801

DATED : September 9, 1986

INVENTOR(S) : KENNETH B. MATTHEWS et al

It is certified that error appears in the above-identified patent and that said Letters Patent is hereby corrected as shown below:

Col. 4, line 6, "change" should read --charge--

Col. 6, line 26, "Rotoviscon" should read --Rotovisco--

Col. 11, line 67, "apprarent" should read --apparent--

Signed and Sealed this

Twenty-third Day of December, 1986

Attest:

DONALD J. QUIGG

Attesting Officer

Commissioner of Patents and Trademarks